March 31, 1925.
E. H. RYON
1,531,510
FRICTION DISK FOR CLUTCHES
Filed Feb. 12, 1923
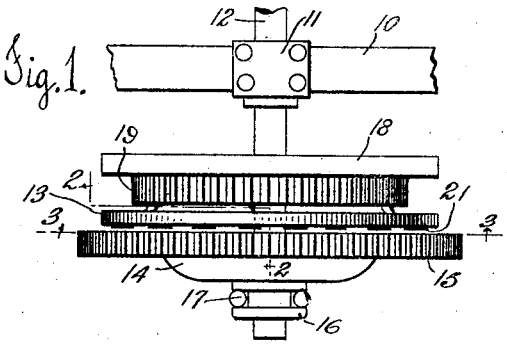
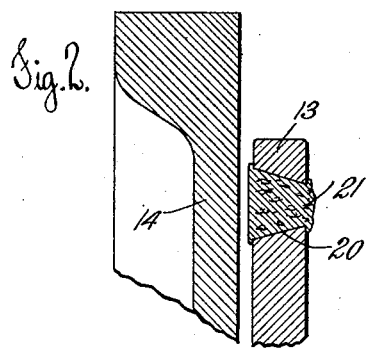
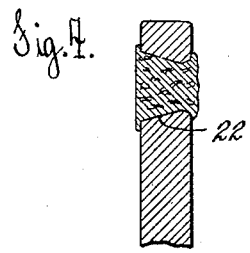
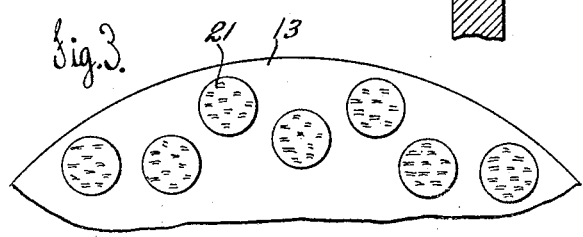
Inventor
Eppa H. Ryon
Southgate & Southgate
Attorneys Patented Mar. 31, 1925.

1,531,510

UNITED STATES PATENT OFFICE.

EPPA H. RYON, OF WALTHAM, MASSACHUSETTS, ASSIGNOR TO CROMPTON & KNOWLES LOOM WORKS, OF WORCESTER, MASSACHUSETTS, A CORPORATION OF MASSACHUSETTS.

FRICTION DISK FOR CLUTCHES.

Application filed February 12, 1923. Serial No. 618,469.

*To all whom it may concern:*

Be it known that I, EPPA H. RYON, a citizen of the United States, residing at Waltham, in the county of Middlesex and State of Massachusetts, have invented a new and useful Friction Disk for Clutches, of which the following is a specification.

This invention relates to a friction disk for use in a clutch of the type in which the surface of the disk is provided with a plurality of plugs of compressible friction material inserted in the face thereof.

It is the object of my invention to provide an improved construction of friction disk for such purposes, so constructed and designed that the plugs will be more firmly secured therein and that a proportionately larger amount of friction surface will be presented for engagement with the co-operating clutch member.

With this general object in view, my invention in its preferred form consists in the provision of a series of conical plugs of cork or other suitable material, mounted in conical recesses in a disk or plate, and projecting entirely through said plate, the larger ends of said plugs forming the friction surface and the smaller ends preferably extending beyond the rear face of the plate and holding the plugs from displacement by the free expansion of the projecting rear portions thereof.

A preferred form of my invention together with a slight modification is shown in the drawings in which—

Fig. 1 is a plan view of certain parts of a loom to which my invention is applied;

Fig. 2 is an enlarged detail sectional view, taken along the line 2—2 in Fig. 1;

Fig. 3 is a front elevation of a portion of the friction disk, taken along the line 3—3 in Fig. 1; and Fig. 4 is a detail sectional view of a slight modification.

Referring to the drawings, I have shown my invention as used in a loom of which I have indicated a portion of the loom side 10, a bearing 11 and a rotatable shaft 12. The friction clutch is mounted on the shaft 12 and comprises a disk or plate 13 fixed to the shaft 12 and a driven clutch member 14 loosely mounted on the shaft and provided with a gear 15 which is continuously rotated by a driving pinion (not shown).

Relative sliding movement of the disk 13 and clutch member 14 is accomplished by means of a clutch collar 16 and yoke 17 or in any other suitable and convenient manner. The disk 13 may be secured to a brake wheel 18 and gear 19 through which the bottom shaft of the loom is driven. My invention, however, is not dependent upon the particular connections to the shaft 12 but relates specifically to the construction of the friction disk 13.

In the preferred form, as shown in Figs. 2 and 3, the disk 13 is provided with conical recesses 20 extending through the disk and having their larger ends toward the clutch member 14. Conical plugs 21 are inserted in the recesses 20 and preferably extend entirely through the plate and beyond the back face thereof. These plugs are commonly made of cork or of some other compressible material and when placed in position are retained in the recesses 20 by the free expansion of the smaller or rear end portions thereof beyond the rear surface of the disk 13, as clearly shown in Fig. 2. When the disk is thus constructed, the plugs engage the co-operating clutch member 14 by their larger ends, thus providing increased friction surface, and any pressure exerted between the clutch members tends to firmly seat the plugs 21 in the recesses 20.

In Fig. 4 I have shown a slight modification in which the smaller ends of the conical openings 22 are countersunk or beveled, instead of being continued to the sharp edges shown in Fig. 2. The two forms of my invention are, however, substantially identical, as far as their operation and advantages are concerned.

Having thus described my invention, I do not wish to be limited to the details herein disclosed, but what I claim is:

1. A friction disk for a clutch comprising a plate having a plurality of conical openings extending therethrough from face to face, and a plurality of friction plugs inserted in said recesses, said plugs being formed of compressible friction material and extending entirely through and beyond said plate and being secured in said recesses by the free expansion of the smaller end portions of said plugs beyond the rear face of said plate.

2. A friction disk for a clutch comprising a plate having a plurality of openings converging from the face rearwardly to a minimum diameter, and a plurality of friction plugs inserted in said openings, said plate permitting free expansion of the plugs at the rear of said minimum diameter and said plugs being formed of compressible friction material and extending from the face of the plate rearwardly to a point beyond the minimum diameter of said openings, said plugs being secured in said recesses by the free expansion of the smaller end portions of said plugs beyond the minimum diameters.

In testimony whereof I have hereunto affixed my signature.

EPPA H. RYON.